United States Patent
Ding et al.

(10) Patent No.: US 11,227,752 B2
(45) Date of Patent: Jan. 18, 2022

(54) COMPOSITION ANALYSIS TECHNOLOGY OF ULTRAMICRO VOLUME LIQUID BY LASER ABLATION PLASMA MASS SPECTROMETRY

(71) Applicant: Guangzhou Institute of Geochemistry, Chinese Academy of Sciences, Guangdong (CN)

(72) Inventors: Xing Ding, Guangdong (CN); Congying Li, Guangdong (CN); Chanchan Zhang, Guangdong (CN); Zhuoyu Liu, Guangdong (CN); Chen Chen, Guangdong (CN); Junjie He, Guangdong (CN); Weidong Sun, Guangdong (CN)

(73) Assignee: GUANGZHOU INSTITUTE OF GEOCHEMISTRY, CHINESE ACADEMY OF SCIENCES

( * ) Notice: Subject to any disclaimer, the term of this patent is extended or adjusted under 35 U.S.C. 154(b) by 3 days.

(21) Appl. No.: 16/830,196

(22) Filed: Mar. 25, 2020

(65) Prior Publication Data
US 2020/0395201 A1    Dec. 17, 2020

(30) Foreign Application Priority Data
Jun. 13, 2019    (CN) .......................... 201910511665.1

(51) Int. Cl.
*H01J 49/00*    (2006.01)
*G01N 1/38*    (2006.01)
(Continued)

(52) U.S. Cl.
CPC ............ *H01J 49/0031* (2013.01); *G01N 1/38* (2013.01); *G01N 27/628* (2013.01); *H01J 49/105* (2013.01); *G01N 2001/2893* (2013.01)

(58) Field of Classification Search
USPC ........................................................ 250/282
See application file for complete search history.

(56) References Cited

U.S. PATENT DOCUMENTS

| | | | |
|---|---|---|---|
| 7,102,005 B2 * | 9/2006 | Agnew | ................ G01N 33/50 544/287 |
| 8,945,932 B2 * | 2/2015 | Patton | ................ G01N 33/6842 436/86 |

(Continued)

*Primary Examiner* — Phillip A Johnston
(74) *Attorney, Agent, or Firm* — Maschoff Brennan; Jonathan M. Benns

(57) ABSTRACT

The present invention relates to a composition analysis technology of ultramicro-volume liquid by laser ablation plasma mass spectrometry. Using a pipette gun to extract the liquid to be detected in a low-temperature environment, dropping the liquid into a dropping pit in a dropping plate, the liquid level is slightly higher than an overflow table in the dropping plate; dropping different liquid samples into different dropping pits by the same method; gradually covering the dropping pit with an analysis film having an area 1.5 times larger than that of the dropping plate from one side of the dropping plate, tightly adhering the thin film onto the dropping plate by using a transparent adhesive tape, the thin film is in close contact with the liquid level; placing the dropping plate covered by the thin film in a LA-ICPMS universal solid sample chamber, and then setting parameters for ablation.

16 Claims, 9 Drawing Sheets

(51) Int. Cl.
    *G01N 27/626*    (2021.01)
    *H01J 49/10*     (2006.01)
    *G01N 1/28*     (2006.01)

(56) References Cited

U.S. PATENT DOCUMENTS 9,449,781 B2 *   9/2016   Yun .......................... G21K 1/06
10,139,332 B2 *   11/2018   Loboda ................... H01J 49/04

* cited by examiner

COMPOSITION ANALYSIS TECHNOLOGY OF ULTRAMICRO VOLUME LIQUID BY LASER ABLATION PLASMA MASS SPECTROMETRY

CROSS-REFERENCE TO RELATED APPLICATIONS

This application claims priority to Chinese Patent Application No. 201910511665.1 filed on Jun. 13, 2019, which is incorporated herein by reference.

TECHNICAL FIELD

The present invention belongs to the technical field of material composition detection, and in particular relates to a technology for realizing microcell in-situ composition analysis of ultramicro-volume (on the order of microliters) liquid on laser ablation plasma mass spectrometry.

BACKGROUND

Material composition detection is an important means for human beings to understand themselves and the world. With the progress of high-tech instruments and high-tech technologies, material composition detection has gradually developed towards high sensitivity, a low detection limit and diversification. Liquid composition analysis has always been the most important constituent part of material composition detection, whether by traditional or modern methods. The analytical detection of liquid composition by adopting various kinds of spectrometers (such as an atomic emission spectrometer AES, an atomic absorption spectrometer AAS, an atomic fluorescence spectrometer AFS, an inductively-coupled plasma emission spectrometer ICP, a Fourier transform infrared spectrometer FTIR, an ultraviolet-visible spectrophotometer UV-Vis, etc.), a chromatographic instrument (a gas chromatograph GC, a high-pressure liquid chromatograph HPLC, a gel permeation chromatograph GPC, a volume exclusion chromatograph SEC, etc.), a mass spectrometer (an inductively-coupled plasma mass spectrometer ICP-MS, a gas chromatography-mass spectrometer GC-MS, a liquid chromatography-mass spectrometer LC-MS, etc.) and a wavelength dispersive spectrometer (a nuclear magnetic resonance spectrometer NMR, an electron paramagnetic resonance spectrometer ESR, etc.) have been widely used in all walks of life, and related detection devices and methods are emerging in endlessly. At present, the existing liquid composition detection devices or methods both require that the liquid to be detected has a volume of several milliliters to a dozen of milliliters. Therefore, in order to meet the requirements of the detection devices or methods, the following two methods are usually adopted to obtain sufficient volume of the liquid: (1) bulk sampling, where a large volume of a liquid sample, such as contaminated water, human blood or urine, etc., is taken directly; and (2) diluting in a certain proportion, where when bulk sampling cannot be carried out, a small amount of the liquid sample is taken first and then diluted to the required volume. Such samples are for example a solution obtained after dissolution of rocks and mineral ores, human saliva, etc. However, these two methods both have some shortcomings. For example, taking a large amount of blood will cause psychological shadow and physical injury to the collected person; however, diluting a small amount of liquid to a large multiple will cause components that originally have a low concentration and a low content in the liquid to be diluted to the vicinity of the detection limit of a detection instrument or below the detection line, thereby causing these components to be unable to be accurately detected or even to be undetectable. Therefore, the development of a technology for analyzing the composition of an ultramicro-volume liquid has broad basic scientific research and practical application values.

In the recent ten years, apparatuses using laser ablation as a sample loading manner, such as laser ablation plasma mass spectrometry, laser ablation multicollector plasma mass spectrometry or laser ablation atomic emission spectrometry and the like, have been widely used in the fields of physical materials, geology and mineral resources, environmental energy and the like fields due to their characteristics of microcell in-situ, high accuracy, a low detection limit, a high cost performance and so on, greatly promoting the development of basic scientific researches and application researches. On one hand, the sample chamber and sample stage of such an apparatus are mostly designed for microcell in-situ composition analysis of a solid sample, and thus it is difficult to apply the apparatus in liquid composition analysis, thereby limiting the application of such an apparatus; and on the other hand, the characteristics such as the low detection limit, the high accuracy and the rapid analysis enables such an apparatus to have the capability of rapidly analyzing the composition of microscale or ultramicro-volume liquid, and thus to be a suitable carrier for developing the ultramicro-volume liquid composition analysis technology.

In view of the current blank in the ultramicro-volume liquid composition analysis technology at home and abroad and the advantages and disadvantages of the laser ablation apparatus when applied in liquid composition analysis, on the basis of researching and developing a dropping plate auxiliary device suitable for the ultramicro-volume liquid composition analysis technology, the applicant of the present application has researched and developed a mass spectrometry composition analysis technology and method for ultramicro-volume liquid analysis using the dropping plate auxiliary device. The technology and method are expected to greatly expand the application range and application space of apparatuses such as the laser ablation plasma mass spectrometry or the laser ablation multicollector plasma mass spectrometry, and to promote the application of these modern high-tech apparatuses, and thus have a strong commercial value; and meanwhile, using this technology and method to realize the composition testing of the ultramicro-volume liquid will also has extensive scientific research and application values.

SUMMARY

In view of the problems existed in the above background art, the present invention is directed to provide a technology for realizing microcell in-situ composition analysis of ultramicro-volume (on the order of microliters) liquid on laser ablation plasma mass spectrometry. The analytical technique has features such as requiring very little volume of the liquid (just little drop of liquid, as low as 0.01 ml) while having many analytical components (at most, capable of analyzing more than 30 elements at the same time), having an extremely low detection limit (with an element detection limit at a ppb level), having fast single-point analysis (only 4 minutes for a single point), being capable of conducting batch analysis (capable of loading more than 10 to more than 20 samples per sample loading), and being easy to generalize.

For this purpose, the present invention adopts the following technical solution: a composition analysis technology of ultramicro-volume liquid by laser ablation plasma mass spectrometry, which includes the steps of:

Step 1. cleaning and preparation of a dropping plate device: in order to avoid mixing with and contaminating by an external substance, soaking a tailor-made dropping plate successively in hydrochloric acid solution and a hydrofluoric acid solution for two hours, cleaning with deionized water, then rinsing with anhydrous ethanol for three times, and baking to dryness in an oven at 60° C. for later use;

Step 2. preparation of liquid to be tested: pipetting a certain amount of the liquid to be tested by using a pipette gun, mixing the liquid with a 1 ppm rhodium standard solution according to a ratio of 1:1, and placing the mixture in an analytical container for later use; wherein, the rhodium concentration after dilution is 0.5 ppm, which is used as an internal standard element for convenience of subsequent calculation of the component contents of the liquid to be tested;

Step 3. loading of ultramicro liquid: pipetting the liquid to be tested by using a 0.01 ml pipette gun in a low-temperature environment, and dropping the liquid into one dropping pit in the dropping plate, so that the liquid level is slightly higher than an overflow table in the dropping plate; dropping different liquid samples into different dropping pits by the same method; gradually covering the dropping pit with an analysis film having an area 1.5 times larger than that of the dropping plate from one side of the dropping plate after the dropping is completed, and tightly adhering the thin film onto the dropping plate by using a transparent adhesive tape after all the dropping pits are covered, so that the thin film is in close contact with the liquid level, and excess liquid overflows from the dropping pit along the overflow table to enter an isolation groove; and placing the dropping plate covered by the thin film in a LA-ICPMS universal solid sample chamber, and fixing the dropping plate well for later testing;

Step 4. state debugging and parameter setting of a LA-ICPMS instrument: closing and vacuumizing the sample chamber, and setting relevant parameters when the silicon count falls below 40,000, wherein helium and hydrogen are used as carrier gases, the flow rate of helium is set to 370 ml/min, the flow rate of nitrogen is set to 5 ml/min, the laser energy is 80 mJ, the laser ablation frequency is 5-10 Hz, and the laser ablation beam spot is 50-110 μm; the ablation time sequence is set as: laser pre-ablation of 120-150 pulses, and a signal collection time of 65 seconds, wherein a blank time is 25 seconds and a ablation time is 40 seconds;

Step 5. LA-ICPMS test analysis: in the test adopting an external standard-sample-external standard method, i.e., using glass standard matters NIST 610 and NIST 612 as double external standards, and setting a test sequence as 2 NIST612+2 NIST610+5 sample analysis+2 NIST612+2 NIST610; and Step 6. processing and data correction of LA-ICPMS analysis signals: adopting a correction software to select a signal interval for the obtained data signals, and then adopting a "multiple external standards-single internal standard" method to carry out calculation and correction, so as to obtain final data.

In order to supplement and perfect the above technical solution, the present invention also includes the following technical features.

Preferably, in the step 1 the dropping plate device comprises a dropping plate formed from a Teflon material, multiple protruding overflow tables are formed on a top surface of the dropping plate, the top surfaces of the overflow tables are flush with each other in height, the overflow tables are spaced apart from each other at a certain distance, concave circular dropping pits with uniform or non-uniform pit diameters are formed on the overflow tables, smooth curved surfaces are formed on the pit bottoms of the circular dropping pits, and all of the peripheral outer edges of the dropping plate form an engagement groove for fixing the dropping plate.

In the step 1 the concentration of the hydrochloric acid solution is 6 mol/L, and the concentration of the hydrofluoric acid solution is 0.5 mol/L.

In the step 2 the rhodium standard solution is a ICPMS dedicated standard solution available from Merck, German.

In the step 3 the analysis film is a sealing film available from Parafilm, United States.

In the step 4, the laser ablation frequency is 8 Hz, the laser ablation beam spot is 74 μm, and the laser pre-ablation is preferably set as 130 pulses.

In the step 6 the correction software is Glitter or ICPMS-DataCal that is currently in common use.

The ICPMSDataCal is preferably adopted as ICPMS-DataCal version 10.9.

The following beneficial effects can be achieved by using the present invention: the laser ablation inductively-coupled plasma mass spectrometry composition analysis technology for ultramicro-volume liquid of the present invention can be applied in the composition analysis of the ultramicro-volume liquid, and the required liquid volume is as low as 0.01 milliliter, which is far lower than the liquid volume required by other testing technologies, thereby making up for the current blank at home and abroad, and thus having broad scientific research and practical values. The laser ablation inductively-coupled plasma mass spectrometry composition analysis technology for the ultramicro-volume liquid of the present invention has features such as high sensitivity, high accuracy, simultaneous acquisition of multiple components (at most, capable of analyzing more than 30 elements at the same time), a low detection limit (with an element detection limit at a ppb level), a high analysis speed and the like, thereby ensuring the reliability of the ultramicro-volume liquid composition analysis. The laser ablation inductively-coupled plasma mass spectrometry composition analysis technology for the ultramicro-volume liquid of the present invention can load more than ten to more than twenty samples at a time, is easy to carry out batch analysis, avoids time and labor consumption caused by frequent sample replacement, and thus is suitable for composition analysis of a large number of samples, and is convenient for rapid and efficient application. The devices and technologies related to the present invention can be popularized and applied to apparatuses using laser ablation as a sample loading manner, such as laser ablation plasma mass spectrometry (LA-ICPMS), laser ablation multicollector plasma mass spectrometry (LA-MC-ICPMS) or laser ablation atomic emission spectrometry (LA-AES), effectively expand the application range of these devices, and have obvious economic and commercial values. At the same time, the related technology can carry out ultramicro-volume liquid composition analysis, which makes up for the current blank at home, and has popularization and application prospects in the fields of biomedicine, geology and mineral resources, environmental energy, physical chemistry and the like.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
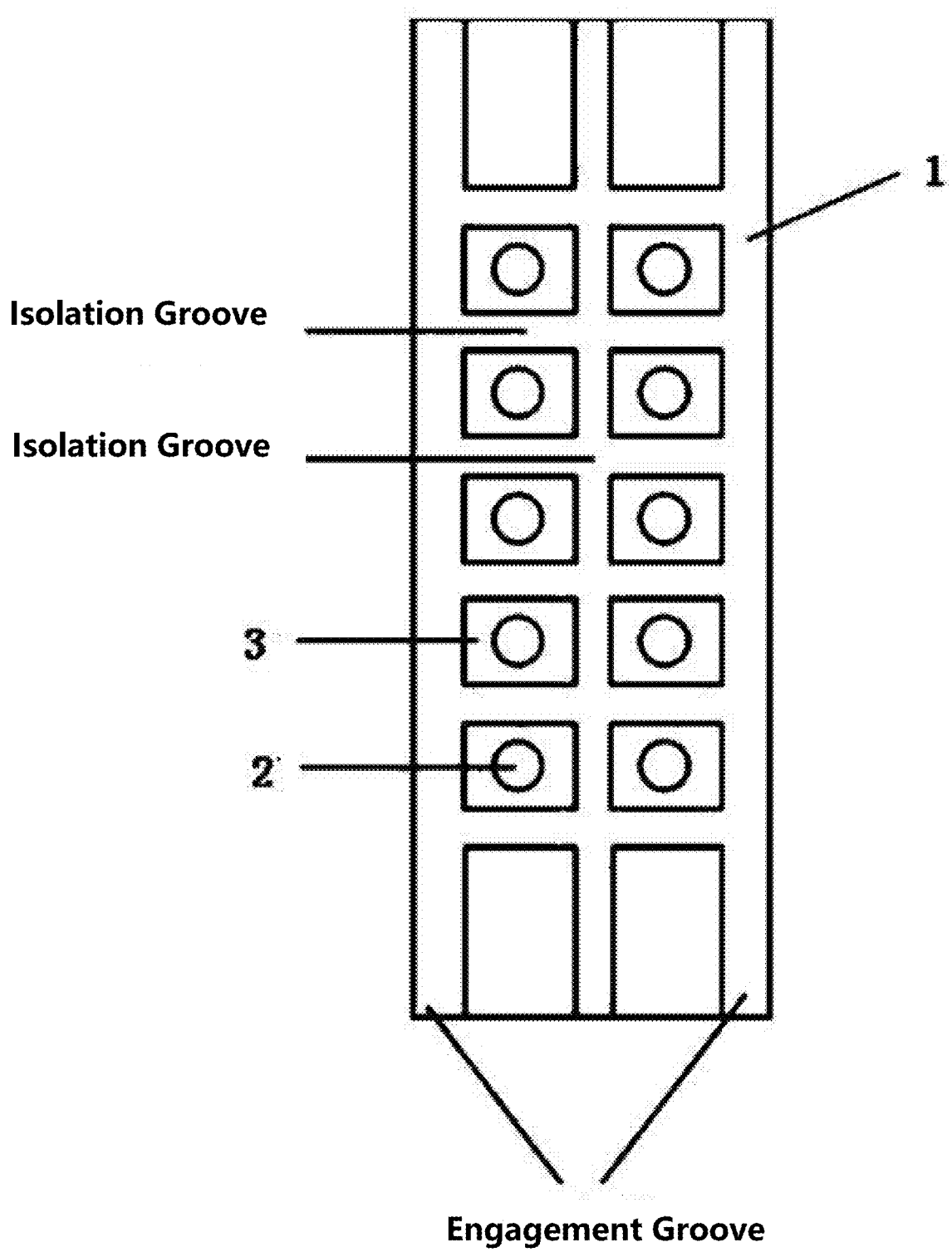
FIG. 1 is a schematic structural diagram of a dropping plate device of the present invention.

As shown in FIG. 1, the dropping plate device of the present invention includes a dropping plate 1 formed from a Teflon material, multiple protruding overflow tables 3 are formed on a top surface of the dropping plate 1, the top surfaces of the overflow tables 3 are flush with each other in height, the overflow tables 3 are spaced apart from each other at a certain distance, concave circular dropping pits 2 with uniform or non-uniform pit diameters are formed on the overflow tables 3, smooth curved surfaces are formed on the pit bottoms of the circular dropping pits 2, and all of the peripheral outer edges of the dropping plate 1 form an engagement groove for fixing the dropping plate 1.

Example 1

(1) A long dropping plate was soaked successively in a 6 mol/L hydrochloric acid solution and a 0.5 mol/L hydrofluoric acid solution for two hours, washed with deionized water, then rinsed with anhydrous ethanol for three times, and baked to dry in an oven at 60° C. for later use.

(2) 1 ml of a multi-element-mixed standard solution GSB04-1768 (containing about 100 ppm of Ti—Nb—Ta—Zr—Hf—W—Mo, produced by the state center for standard matter) was taken and mixed with 1 ml of a 1 ppm rhodium standard solution (a ICPMS dedicated standard solution available from Merck, German).

(3) The solution obtained by mixing in the step (2) was dropped into the dropping pits of the Teflon dropping plate that is cleaned and ready for use in the step (1) using a 0.01 ml pipette gun, where about 0.015 ml of a solution was dropped into each dropping pit, so that the liquid level is much higher than that of the overflow table of the dropping plate. A marker was made on one side of the dropping plate to facilitate identification of samples in respective dropping pits.

(4) A Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 8 Hz, and the laser ablation beam spot was 74 μm. The ablation time sequence was set as: laser pre-ablation of 130 pulses, and a signal collection time of 65 seconds, wherein a blank time was 25 seconds and a ablation time was 40 seconds.

Figure 2:
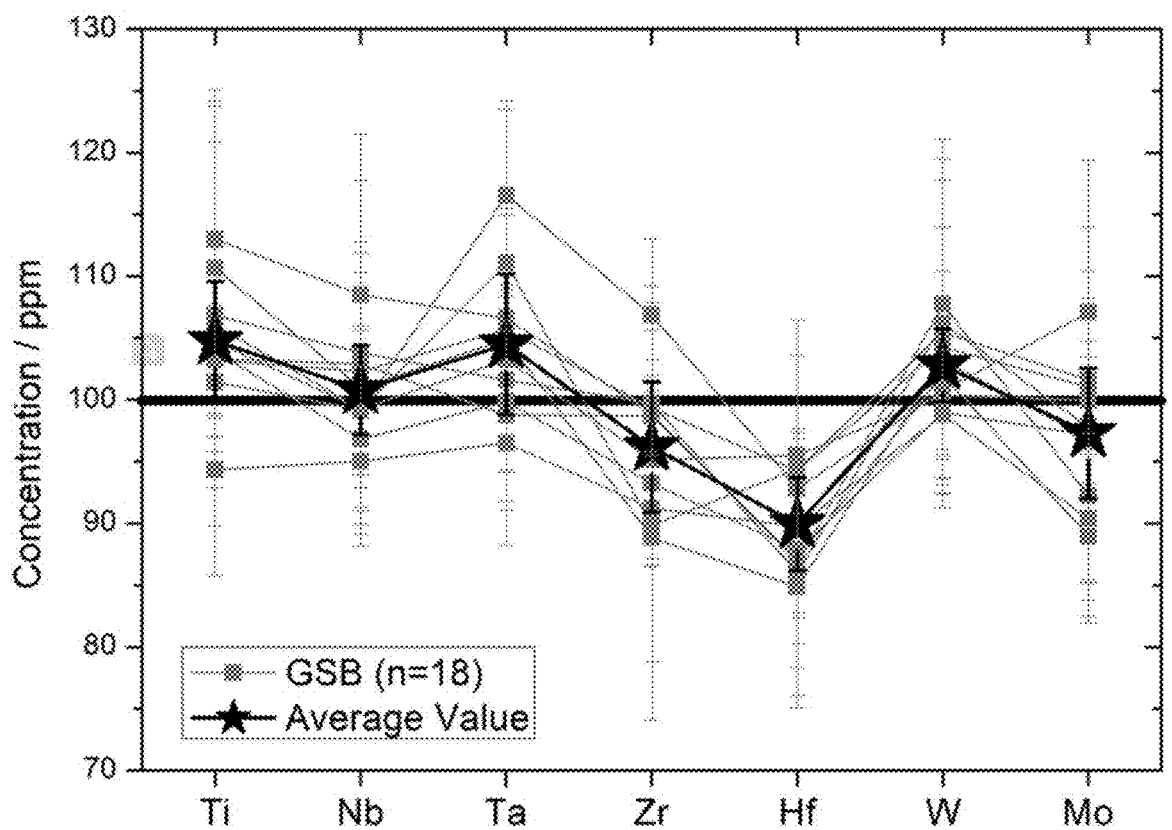
FIG. 2 is a graph showing the element contents, average contents and errors of 18 LA-ICPMS tests of an ultramicro-volume multi-element-mixed standard solution (gsb04-1768) in Example 1 of the present invention.
Figure 3:
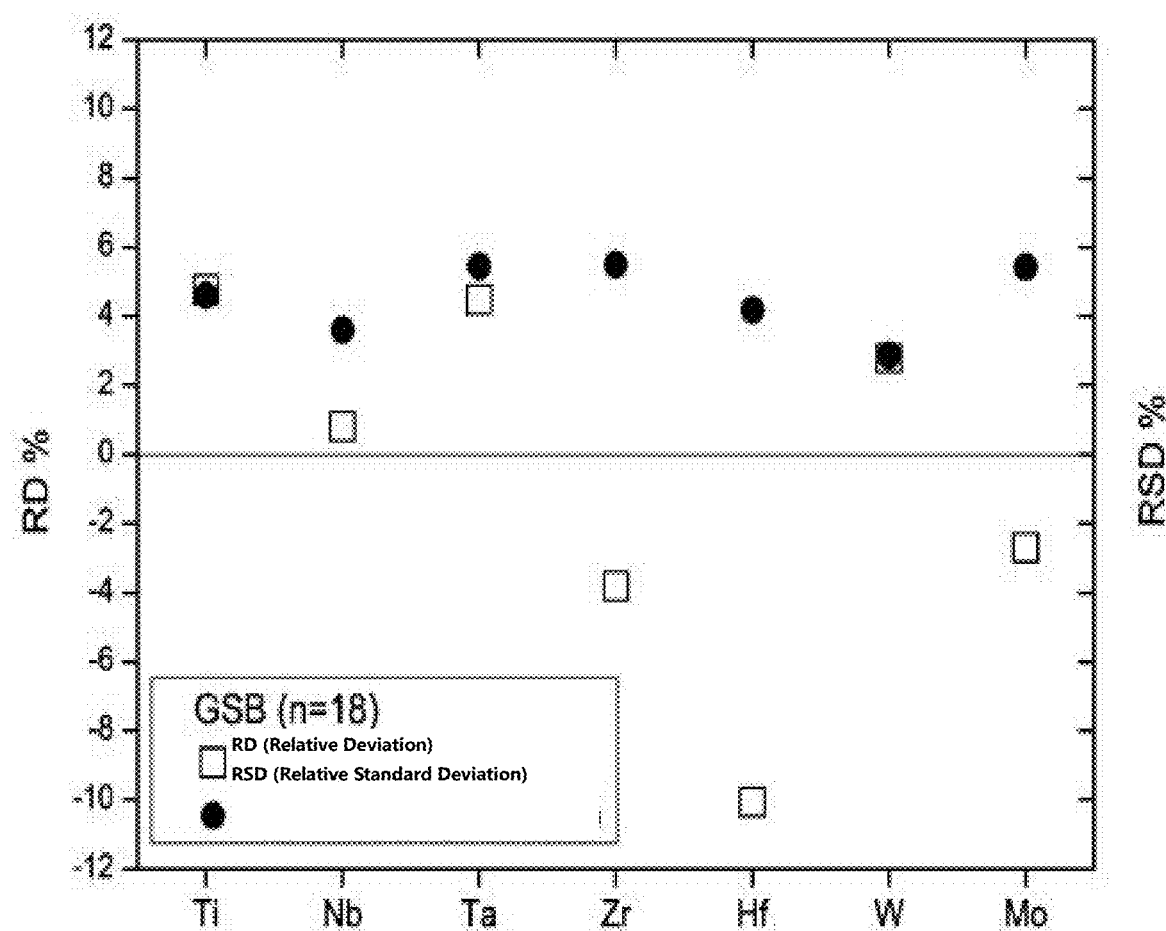
FIG. 3 is a distribution diagram showing the relative deviation and relative standard deviation of each element in the 18 LA-ICPMS tests of the ultramicro-volume multi-element-mixed standard solution (gsb04-1768) in Example 1 of the present invention.

(7) The elements to be tested, such as Ti, Nb, Ta, Zr, Hf, W, Mo, etc., were selected according to a La-ICP MS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIST610. (8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 1 ppm according to the initial added amount for correction, so as to obtain the final composition data. FIGS. 2 and 3 were schematic diagrams showing the results of 18 tests in this example, where FIG. 2 showed that the components contained in the multi-element-mixed standard solution GSB04-1768 obtained by the technology of the present invention were: Ti 104.8±4.8 ppm, Nb 100.8±3.6 ppm, Ta 104.5±5.7 ppm, Zr 96.2±5.3 ppm, Hf89.9±3.8 ppm, W 102.8±2.9 ppm, Mo 97.3±5.3 ppm, respectively, which were consistent with the recommended values within the error range. FIG. 3 showed that for this test example, the relative deviation was within 10%, while the relative standard deviation was within 6%, which were far better than the deviation (usually within 25%) currently approved for LA-ICPMS data at home and abroad. Therefore, the technical invention still ensured the high precision, high accuracy and high sensitivity of the test results while exhibiting the technical advantages of the ultramicro-volume liquid composition analysis.

Example 2

(1) A dropping plate was soaked successively in a 6 mol/L hydrochloric acid solution and a 0.5 mol/L hydrofluoric acid solution for two hours, washed with deionized water, then rinsed with anhydrous ethanol for three times, and baked to dry in an oven at 60° C. for later use.

(2) 0.5 ml of a solution was drawn from a simulated sample of a high-temperature and high-pressure experiment (a composition distribution experiment of hornblende and a fluid under the conditions of 1,000 atm and 750° C.) with a microsampler, injected into a 5 ml centrifuge tube, placed in a centrifuge and centrifuged at 6000 rpm for 20 minutes, then 0.1 ml of the supernatant is pipetted with a 0.1 ml pipette gun, diluted to 0.5 ml with deionized water, and then 0.5 ml of a 1 ppm rhodium standard solution (a ICPMS dedicated standard solution available from Merck, German) was taken and mixed with the solution to 1 ml, which was equivalent to diluting the original solution taken from the experiment by 10 times.

(3) The solution obtained by mixing in the step (2) was dropped into the dropping pits of the Teflon dropping plate that is cleaned and ready for use in the step (1) using a 0.01 ml pipette gun, where about 0.01 ml of a solution was dropped into each dropping pit, so that the liquid level is slightly higher than that of the overflow table of the dropping plate. (4) A Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 8 Hz, and the laser ablation beam spot was 110 μm. The ablation time sequence was set as: laser pre-ablation of 120 pulses, and a signal collection time of 65 seconds, wherein a blank time was 25 seconds and a ablation time was 40 seconds.

(7) As many elements to be tested as possible were selected according to the LA-ICPMS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIS T610.

Figure 4:
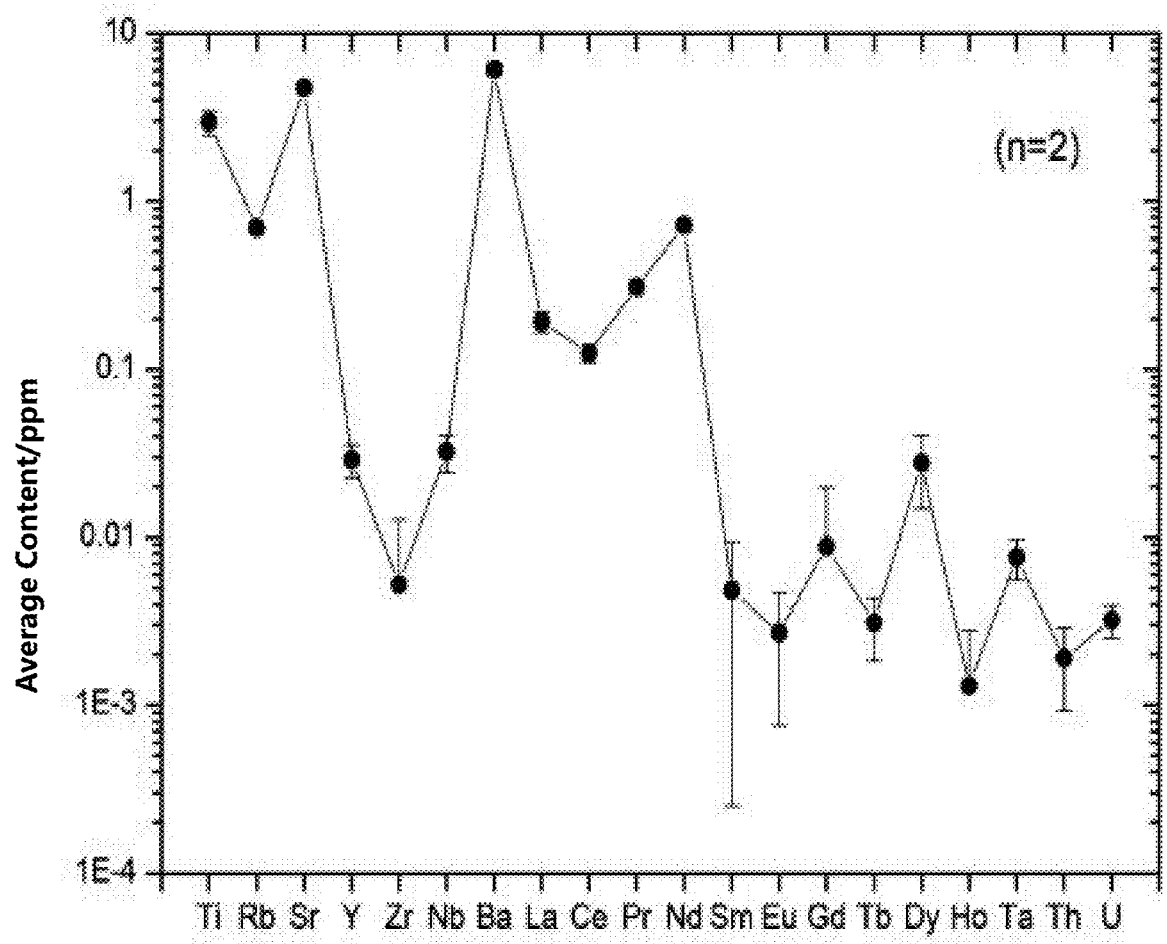
FIG. 4 is an information diagram showing the composition of a fluid obtained in Example 2 of the present invention, which is in reaction equilibrium with hornblende under high temperature and high pressure conditions.

(8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 0.5 ppm according to the initial added amount for correction, and then the obtained element content was multiplied by the dilution multiple (10 times) to obtain the final composition data. FIG. 4 was a schematic diagram of the results of 2 tests in this example. The results showed that the fluid components extracted from the high-temperature and high-pressure experiments were mainly rich in Ti, Rb, Sr, Ba and light rare-earth elements, and contained a small amount of Nb, Zr, Y, Th, U and heavy rare-earth elements. Through these obtained element contents, the situations of element distribution between the hornblende and the fluid could be discussed, thereby providing instructions for the key scientific issues of element migration, circulation, diagenesis and mineralization in an earth system. Furthermore, the contents of the latter several components were in a range of several to dozens of ppbs, which once again proved that the detection limit in the test of this example was extremely low and had the characteristics of a low detection limit and high sensitivity.

Example 3

(1) A dropping plate was soaked successively in a 6 mol/L hydrochloric acid solution and a 0.5 mol/L hydrofluoric acid solution for two hours, washed with deionized water, then rinsed with anhydrous ethanol for three times, and baked to dry in an oven at 60° C. for later use.

(2) 1 milligram of the national basalt standard sample powder GSR-3 (purchased from the state center for standard matter) was weighed, dissolved by a traditional acid dissolution method, evaporated to dryness, and then brought to a constant volume of 2 milliliters by using 3% dilute nitric acid. 1 ml of the solution was taken and mixed with 1 ml of a 1 ppm rhodium standard solution (a ICPMS dedicated standard solution available from Merck, German).

(3) The solution obtained by mixing in the step (2) was dropped into the dropping pits of the Teflon dropping plate that is cleaned and ready for use in the step (1) using a 0.01 ml pipette gun, where about 0.01 ml of a solution was dropped into each dropping pit, so that the liquid level is slightly higher than that of the overflow table of the dropping plate.

(4) a Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 8 Hz, and the laser ablation beam spot was 74 µm. The ablation time sequence was set as: laser pre-ablation of 130 pulses, and a signal collection time of 65 seconds, wherein a blank time was 25 seconds and a ablation time was 40 seconds.

(7) As many elements to be tested as possible were selected according to the LA-ICPMS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIS T610.

Figure 5:
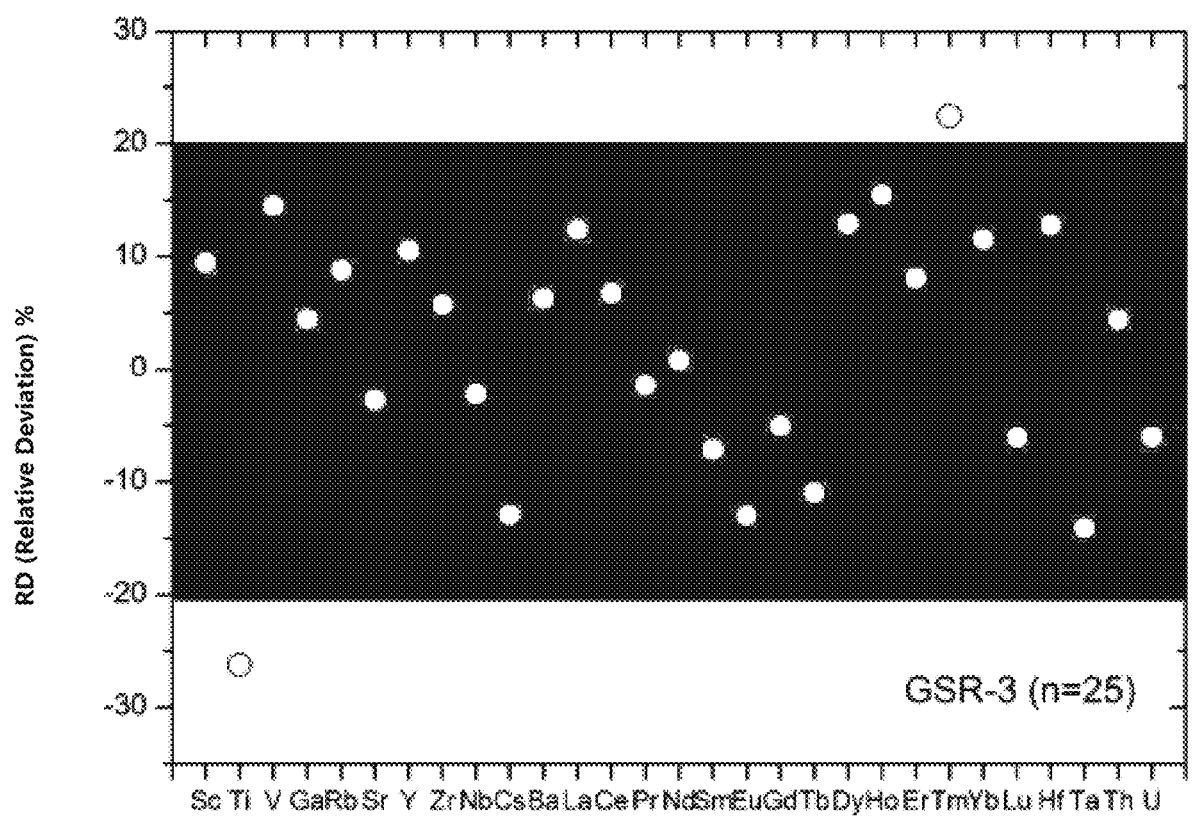
FIG. 5 is a diagram showing the distribution of relative deviation between 25 actually-measured results and recommended values for 29 element components in a national basalt standard matter (GSR-3) in Example 3 of the present invention.

(8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 1 ppm according to the initial added amount for correction, so as to obtain the final composition data. FIG. 5 was a schematic diagram of the comparison between 25 test results and recommended element content of the standard matter in this example, showing that the contents of 29 effective element components were obtained from the 25 tests in this test example, where the relative deviation between the actually measured contents and the recommended values of 17 elements was within 10%, and except for two elements of Ti and Tm, the relative deviation of each of the other elements was within 20%. This showed that the results of the composition analysis of the ultramicro-volume liquid composed of multiple elements by the present technical invention were also completely reliable.

Example 4

(1) A dropping plate was soaked successively in a 6 mol/L hydrochloric acid solution and a 0.5 mol/L hydrofluoric acid solution for three hours, washed with deionized water, then rinsed with anhydrous ethanol for three times, and baked to dry in an oven at 60° C. for later use.

(2) 1 ml of a multi-element-mixed standard solution SGB-YYA08002 (containing about 10 ppm of Ti—Nb—Ta—Zr—W—Ge—Sn—Sb, purchased from the state center for standard matter) was taken and mixed with 1 ml of a 1 ppm rhodium standard solution (a ICPMS dedicated standard solution available from Merck, German).

(3) The solution obtained by mixing in the step (2) was dropped into the dropping pits of the Teflon dropping plate that is cleaned and ready for use in the step (1) using a 0.01 ml pipette gun, where about 0.015 ml of a solution was dropped into each dropping pit, so that the liquid level is much higher than that of the overflow table of the dropping plate.

(4) A Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 10 Hz, and the laser ablation beam spot was 110 The ablation time sequence was set as: laser pre-ablation of 120 pulses, and a signal collection time of 65 seconds, wherein a blank time was 25 seconds and a ablation time was 40 seconds.

(7) The elements to be tested, such as Ti, Nb, Ta, Zr, W, Ge, Sn, Sb, etc., were selected according to a La-ICP MS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIS T610.

Figure 6:
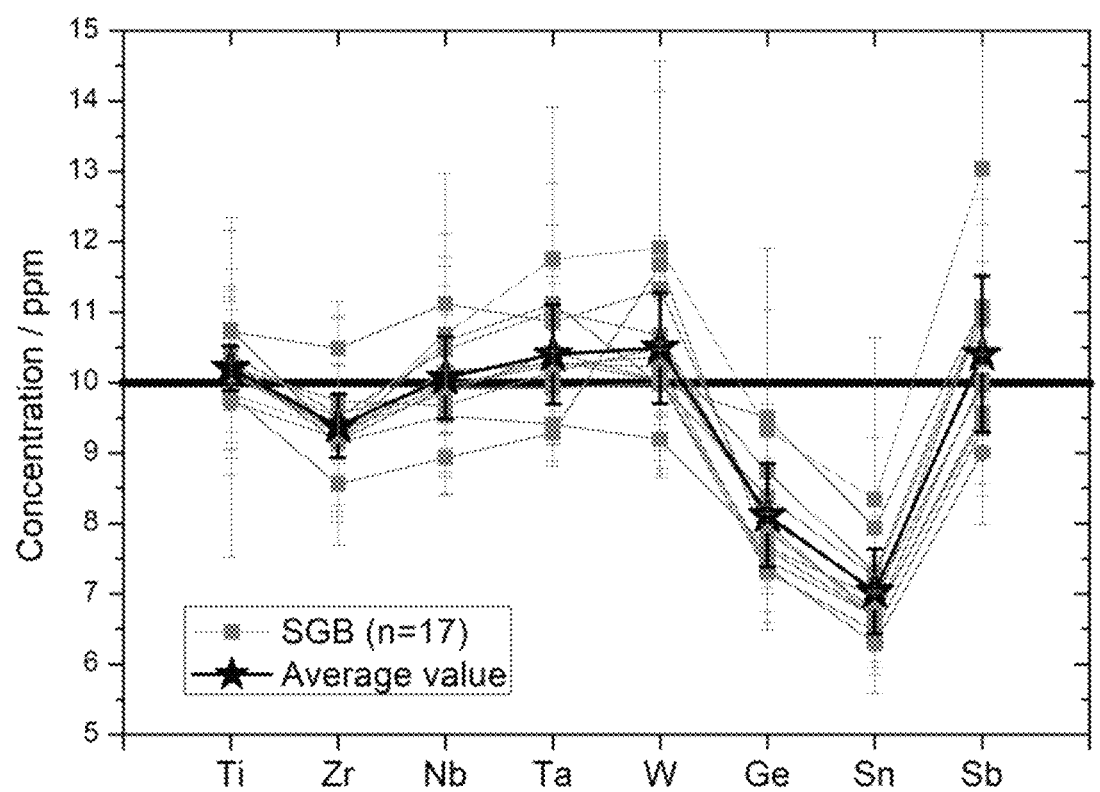
FIG. 6 is a graph showing the element contents, average contents and errors of 8 elements in the 17 LA-ICPMS tests of an ultramicro-volume multi-element-mixed standard solution (SGB-YYA08002) in Example 4 of the present invention.
Figure 7:
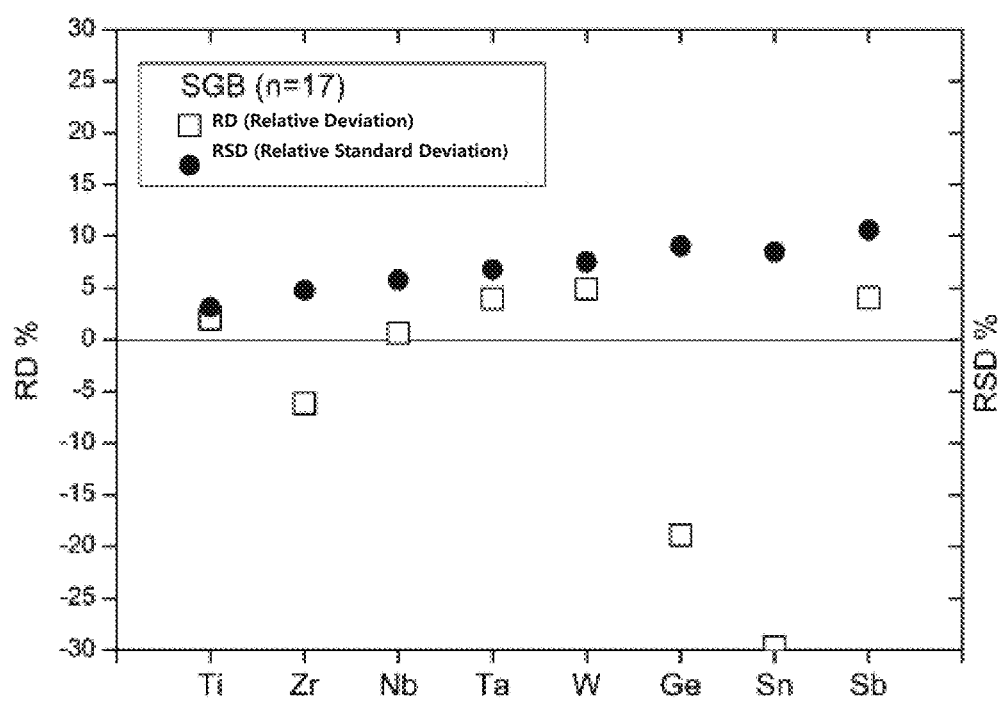
FIG. 7 is a distribution diagram showing the relative deviation and relative standard deviation of 8 elements in the 17 LA-ICPMS tests of the ultramicro-volume multi-element-mixed standard solution (SGB-YYA08002) in Example 4 of the present invention.

(8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 1 ppm according to the initial added amount for correction, so as to obtain the final composition data. FIGS. 6 and 7 were schematic diagrams showing the results of 17 tests in this example, where FIG. 6 showed that the components contained in the multi-element-mixed standard solution SGB-YYA08002 obtained by the technology of the present invention were: Ti 10.2±0.3 ppm, Zr 9.4±0.5 ppm, Nb 10.1±0.6 ppm, Ta 10.4±0.7 ppm, W 10.5±0.8 ppm, Ge 8.1±0.8 ppm, Sn 7.0±0.6 ppm, Sb 10.4±1.1 ppm, respectively, so that except that the actually measured values of Ge and Sn were lower, other elements were consistent with the recommended values within the error range. FIG. 7 showed that for this test example, the relative deviation was within 30%, while the relative standard deviation was within 10%.

Example 5

(1) A dropping plate was soaked successively in a 6 mol/L hydrochloric acid solution and a 0.5 mol/L hydrofluoric acid solution for three hours, washed with deionized water, then rinsed with anhydrous ethanol for three times, and baked to dry in an oven at 60° C. for later use.

(2) 1 milligram of the national andesite standard sample powder GSR-2 (purchased from the state center for standard matter) was weighed, dissolved by a traditional acid dissolution method, evaporated to dryness, and then brought to a constant volume of 2 milliliters by using 3% dilute nitric acid. 1 ml of the solution was taken and mixed with 1 ml of a 1 ppm rhodium standard solution (a ICPMS dedicated standard solution available from Merck, German).

(3) The solution obtained by mixing in the step (2) was dropped into the dropping pits of the Teflon dropping plate that is cleaned and ready for use in the step (1) using a 0.01 ml pipette gun, where about 0.01 ml of a solution was dropped into each dropping pit, so that the liquid level is slightly higher than that of the overflow table of the dropping plate. (4) A Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 8 Hz, and the laser ablation beam spot was 74 The ablation time sequence was set as: laser pre-ablation of 130 pulses, and a signal collection time of 65 seconds, wherein a blank time was 25 seconds and a ablation time was 40 seconds.

(7) As many elements to be tested as possible were selected according to the LA-ICPMS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIS T610.

Figure 8:
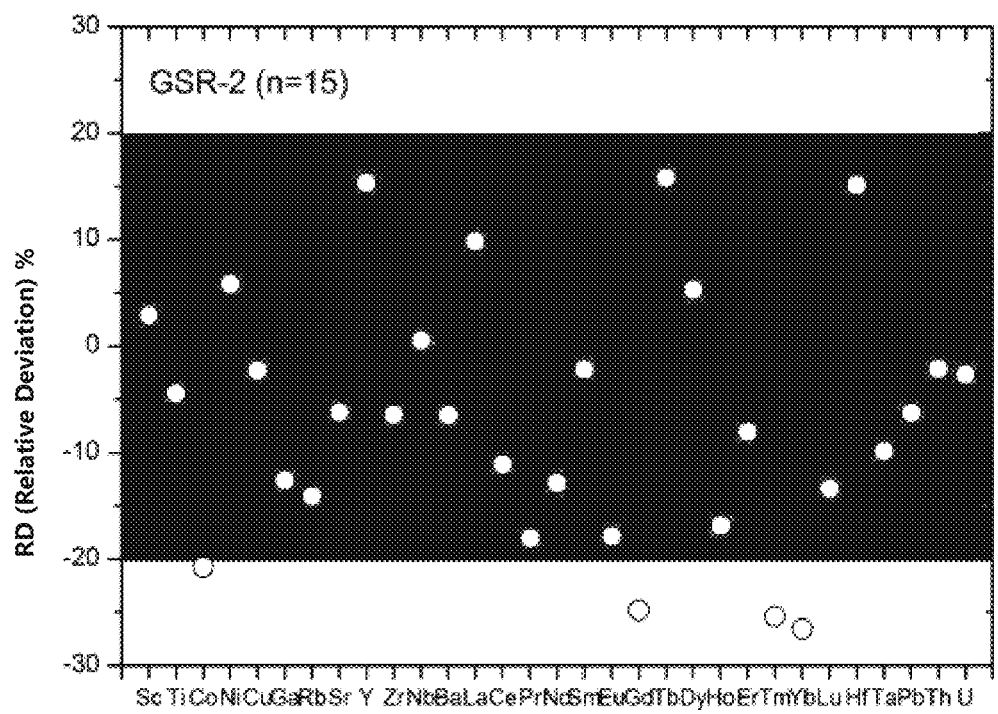
FIG. 8 is a diagram showing the distribution of relative deviation between 15 actually-measured results and recommended values for 31 element components in a national andesite standard matter (GSR-2) in Example 5 of the present invention.

(8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 1 ppm according to the initial added amount for correction, so as to obtain the final composition data. FIG. 8 was a schematic diagram of the comparison between 15 test results and recommended element content of the standard matter in this example, showing that the contents of 31 effective element components were obtained from the 15 tests in this test example, where the relative deviation between the actually measured contents and the recommended values of most elements was within 20%.

Example 6

(1) A dropping plate was soaked successively in a 6 mol/L hydrochloric acid solution and a 0.5 mol/L hydrofluoric acid solution for three hours, washed with deionized water, then rinsed with anhydrous ethanol for three times, and baked to dry in an oven at 60° C. for later use.

(2) 1 milligram of an international diabase standard sample powder W-2 (purchased from the United States Geological Survey) was weighed, dissolved by a traditional acid dissolution method, evaporated to dryness, and then brought to a constant volume of 2 milliliters by using 3% dilute nitric acid. 1 ml of the solution was taken and mixed with 1 ml of a 1 ppm rhodium standard solution (a ICPMS dedicated standard solution available from Merck, German).

(3) The solution obtained by mixing in the step (2) was dropped into the dropping pits of the Teflon dropping plate that is cleaned and ready for use in the step (1) using a 0.01 ml pipette gun, where about 0.015 ml of a solution was dropped into each dropping pit, so that the liquid level is much higher than that of the overflow table of the dropping plate. (4) A Parafilm thin film with a width of about 6 cm was cut by using a scissor, and gradually covered onto the dropping plate on which the solution had been dropped in the step (3) from one side of the dropping plate, and the excess solution overflowed the overflow table to enter an isolation groove; while covered, the thin film was stretched slightly to both sides, so that the thin film could be better in contact with the overflow table. When the thin film completely covered the dropping plate, the thin film was firmly adhered to the back side of the dropping plate with a transparent adhesive to keep the film in close contact with the overflow table of the dropping plate and prevent the excess solution entering the isolation groove from volatilizing.

(5) The film-coated dropping plate in the step (4) was placed one by one into a LA-ICPMS universal sample loading device, and the paper on the outward side of the Parafilm thin film was carefully teared off to expose the complete thin film. At the same time, international standard glass matters NIST610 and NIST612 were also put into the LA-ICPMS universal sample loading device.

(6) The LA-ICPMS universal loading device that is ready for use in the step (5) was placed into a LA-ICPMS sample chamber, the door of the chamber was closed, and the chamber was vacuumized. When the silicon count fallen below 40,000, the instrument parameters were set. Helium and hydrogen were used as carrier gases, the flow rate of helium was set as 370 ml/min, the flow rate of nitrogen was set as 5 ml/min, the laser energy was 80 mJ, the laser ablation frequency was 8 Hz, and the laser ablation beam spot was 74 μm. The ablation time sequence was set as: laser pre-ablation of 140 pulses, and a signal collection time of 65 seconds, wherein a blank time was 25 seconds and a ablation time was 40 seconds.

(7) As many elements to be tested as possible were selected according to the LA-ICPMS universal method. In the test process, an external standard-sample-external standard method was adopted, i.e., using glass standard matters NIST 610 and NIST 612 as double external standards, and setting a test sequence as 2 NIST612+2 NIST610+5 sample analysis+2 NIST612+2 NIS T610.

Figure 9:
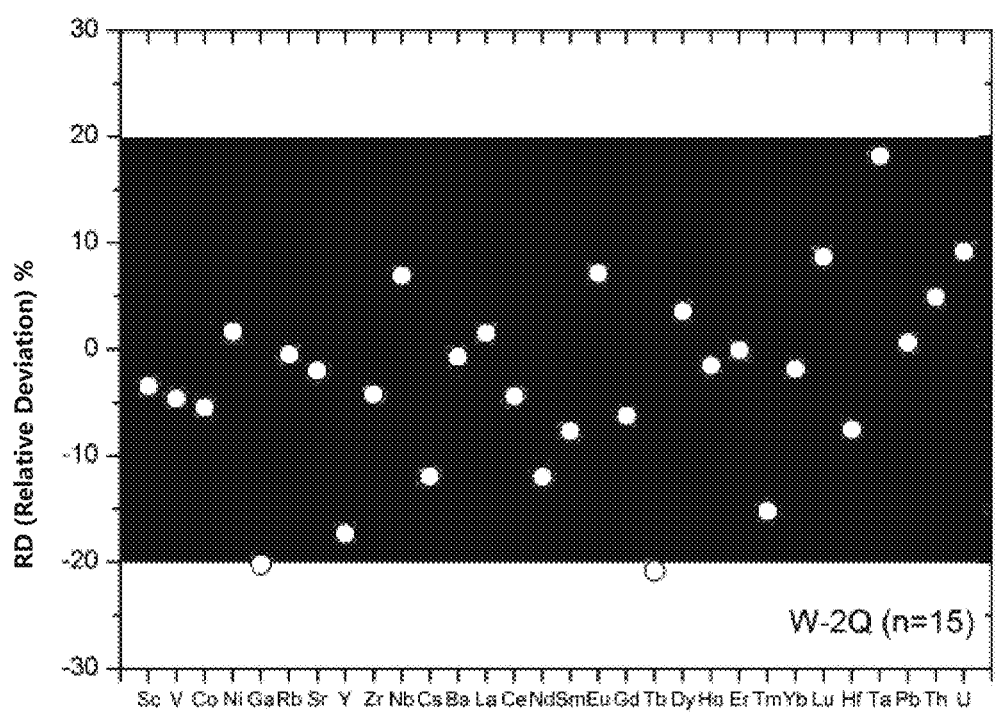
FIG. 9 is a diagram showing the distribution of relative deviation between 15 actually-measured results and recommended values for 30 element components in an international diabase reference material (W-2) in Example 6 of the present invention.

(8) The data collected in the step (7) were imported into a universal software ICPMSDataCal (version 10.9) matched with LA-ICPMS for signal interval selection, and then a "multiple external standards-single internal standard" method was adopted for calculation and correction. The international standard glass matters NIST610 and NIST612 were automatically corrected by using values recommended by the ICPMSDataCal software, while the content of the internal standard element, rhodium, was set as 1 ppm according to the initial added amount for correction, so as to obtain the final composition data. FIG. 9 was a schematic diagram of the comparison between 15 test results and recommended element content of the standard matter in this example, showing that the contents of 30 effective element components were obtained from the 15 tests in this test example, where the relative deviation between the actually measured contents and the recommended values of almost all elements was within 20%, and the relative deviation of most elements was within 10%.

Summary: the core of the laser ablation inductively-coupled plasma mass spectrometry composition analysis technology for the ultramicro-volume liquid of the present invention is sealing the little drop of liquid in a narrow space by using a tailor-made dedicated dropping plate and a thin film, so as to artificially construct a small vacuole; then by exerting the specialty of the LA-ICPMS instrument, focusing the laser below a surface of the vacuole, penetrating the thin film by laser ablation to obtain the composition information of the liquid, thereby realizing analysis and test for the composition of the ultramicro-volume liquid components with high sensitivity and high precision.

The dedicated dropping plate is a necessary auxiliary device for realizing the LA-ICPMS composition analysis of the ultramicro-volume liquid. Its structure and size can be designed according to an universal sample target of a laser ablation sampling apparatus, and it can be designed as having several or dozens of dropping pits with uniform or non-uniform sizes according to different sizes, so that it can hold several or dozens of liquid samples simultaneously for batch analysis, avoiding the trouble of frequently replacing samples. The size of each dropping pit is small, and thus requires a small liquid volume which is only 100 microliters of the liquid at the minimum, thereby avoiding the concern that components cannot be accurately detected due to high dilution of the liquid. Each dropping pit has a gentle radian of 60 degrees, and a smooth pit bottom, which reduces the surface tension of the liquid, and facilitates the wiping and cleaning of the dropping plate and the dropping pit before and after the analysis. A flat overflow table is arranged at the periphery of each dropping pit, which is convenient for covering with the thin film after the dropping pit is filled with the liquid, and avoids mixed contamination of the components due to volatilization in the analysis and testing process. An isolation groove is arranged between each dropping pit unit, which facilitates accommodation of liquid overflowing from the dropping pit and also ensures that the liquid in each dropping pit will not be mixed with other liquids. The whole dropping plate is designed as being made of a Teflon material, and is resistant to strong acid and strong alkali. Therefore, the technical invention is not only suitable for composition test of common liquid, but also suitable for composition analysis of strong acid and strong alkali liquid, and thus has a wide application. The whole dropping plate is simple in structure, low in cost and easy to use, can greatly expand the application range and application space of apparatuses such as laser ablation plasma mass spectrometry or laser ablation multicollector plasma mass spectrometry, and has strong practical application and commercial economic values.

The Parafilm thin film is used for film covering treatment, and the liquid is completely sealed in the dropping pit on the dropping plate by utilizing the extremely strong tensile toughness of the thin film and the surface tension of the liquid, thereby artificially constructing a tiny vacuole. This technical method is the key procedure for realizing the LA-ICPMS composition analysis of the ultramicro-volume liquid. Only when the liquid is completely sealed in the dropping pit and the liquid is in close contact with the thin film, the component signal of the liquid can be obtained by subsequent LA-ICPMS analysis; and otherwise, the subsequent LA-ICPMS analysis cannot obtain the component signal of the liquid at all, or obtains a poor component signal, and thus the composition of the ultramicro-volume liquid cannot be satisfactorily tested. Therefore, when the liquid to be tested is dropped into a dropping pit on the dropping plate, the liquid level must be ensured to be higher than the overflow table; meanwhile, when the film is covered, the thin film is properly stretched to tenseness, so that excessive liquid can overflow the dropping pit, and form a liquid layer on the surface of the overflow table. Through the surface tension of the liquid layer, the thin film closely fits the surface of the overflow table on the dropping plate, so that the liquid in the dropping pit can be ensured to be in a sealed state and closely fit and be contacted with the thin film. The technical invention creatively adopts the film covering treatment, which on one hand can avoid volatilization of a small volume of liquid components, thereby affecting the final analysis result; and on the other hand enables the liquid sample to be artificially processed into a solid-like sample, which is convenient for microcell in-situ analysis of one focused place by LA-ICPMS. Furthermore, the Parafilm thin film as used can also be resistant to strong acid and strong alkali, and thus is also suitable for analysis of fluids with a wide range of components.

In the process of the LA-ICPMS composition test, pre-ablation must be carried out, and the pre-ablation pulse is set as 120-150 pulses, and the optimal pre-ablation pulse is 130 pulses. This is another key procedure for realizing the LA-ICPMS composition analysis of ultramicro-volume liquid by the present technical method. After the ultramicro fluid is subjected to the film covering treatment, there will be a layer of Parafilm thin film with a thickness of about 150-170 microns between the liquid and the laser. Therefore, in order to ensure that the component signals of the fluid can be successfully obtained in a LA-ICPMS test process, the thin film must be thinned first, so that the laser can penetrate the thin film to focus on the fluid in time. The technical invention adopts a key procedure of laser pre-ablation, aiming at thinning the thin film through laser ablation. Through many testing experiments and inspections, the thickness of the residual thin film is still relatively large when the pre-ablation pulse is less than 120, which causes that it requires to ablate the residual thin film with the laser first after a test starts, thereby resulting in too little time for signal collection. When the pre-ablation pulse is higher than 150, the thin film is ablated before a test starts, and thus the space of the sealed fluid is destroyed, and the components of the fluid will be easily lost. By using a pre-ablation pulse of 130, it can not only ensure that the thin film is effectively ablated and thinned, but also ensure that the thin film can be penetrated almost at the same time when a test is started, thereby achieving the optimization of signal collection.

Both the LA-ICPMS composition test and data analysis parts of the present technical invention adopt the LA-ICPMS analysis flow, standard matter and data processing software and method that are in common use at home and abroad. On one hand, it ensures the inherent characteristics of the LA-ICPMS test, such as high sensitivity, high precision, high accuracy, multi-component (at most, capable of analyzing more than 30 elements at the same time), an extremely low detection limit (with an element detection limit at a ppb level), a high analysis speed, and the like; and on the other hand, it facilitates the application and popularization of the present technical invention and improves the economic and commercial values of the present technical invention.

The basic principles, main features, and advantages of the present invention are shown and described above. It should be understood by those skilled in the art that, the present invention is not limited by the aforementioned embodiments. The aforementioned embodiments and the description only illustrate the principle of the present invention. Various changes and modifications may be made to the present invention without departing from the spirit and scope of the present invention. Such changes and modifications all fall within the claimed scope of the present invention. The scope of the present invention is defined by the appended claims and their equivalents.

What is claimed is:

1. A method of composition analysis of ultramicro-volume liquid by laser ablation plasma mass spectrometry, the method comprising the steps of:
   Step 1. cleaning and preparation of a dropping plate device: in order to avoid mixing with and contaminating by an external substance, soaking a tailor-made dropping plate successively in hydrochloric acid solution and a hydrofluoric acid solution for two hours, cleaning with deionized water, then rinsing with anhydrous ethanol for three times, and baking to dryness in an oven at 60° C. for later use;
   Step 2. preparation of liquid to be tested: pipetting a certain amount of the liquid to be tested by using a pipette gun, mixing the liquid with a 1 ppm rhodium standard solution according to a ratio of 1:1, and placing the mixture in an analytical container for later use; wherein, the rhodium concentration after dilution is 0.5 ppm, which is used as an internal standard element for convenience of subsequent calculation;
   Step 3. loading of ultramicro liquid: pipetting the liquid to be tested by using a 0.01 ml pipette gun in a low-temperature environment, and dropping the liquid into one dropping pit in the dropping plate, so that the liquid level is slightly higher than an overflow table in the dropping plate; dropping different liquid samples into different dropping pits by the same method; gradually covering the dropping pit with an analysis film having an area 1.5 times larger than that of the dropping plate from one side of the dropping plate after the dropping is completed, and tightly adhering the thin film onto the dropping plate by using a transparent adhesive tape after all the dropping pits are covered, and appropriately stretching and tightening the thin film, so that the thin film is in close contact with the liquid level, and excess liquid overflows from the dropping pit along the overflow table to enter an isolation groove; and placing the dropping plate covered by the thin film in a LA-ICPMS universal solid sample chamber, and fixing the dropping plate well for later testing;
   Step 4. state debugging and parameter setting of a LA-ICPMS instrument: closing and vacuumizing the sample chamber, and setting relevant parameters when the silicon count falls below 40,000, wherein helium and hydrogen are used as carrier gases, the flow rate of helium is set to 370 ml/min, the flow rate of nitrogen is set to 5 ml/min, the laser energy is 80 mJ, the laser ablation frequency is 5-10 Hz, and the laser ablation beam spot is 50-110 μm; the ablation time sequence is set as: laser pre-ablation of 120-150 pulses, and a signal collection time of 65 seconds, wherein a blank time is 25 seconds and a ablation time is 40 seconds;
   Step 5. LA-ICPMS test analysis: in the test adopting an external standard-sample-external standard method, i.e., using glass standard matters NIST610 and NIST 612 as double external standards, and setting a test sequence as 2 NIST612+2 NIST610+5 sample analysis+2 NIST612+2 NIST610; and
   Step 6. processing and data correction of LA-ICPMS analysis signals: adopting a correction software to select a signal interval for the obtained data signals, and then adopting a "multiple external standards-single internal standard" method to carry out calculation and correction, so as to obtain final data.

2. The method of composition analysis of ultramicro-volume liquid by laser ablation plasma mass spectrometry according to claim 1, wherein in the step 1 the dropping plate device comprises a dropping plate formed from a Teflon material, multiple protruding overflow tables are formed on a top surface of the dropping plate, the top surfaces of the overflow tables are flush with each other in height, the overflow tables are spaced apart from each other at a certain distance, concave circular dropping pits with uniform or non-uniform pit diameters are formed on the overflow tables, smooth curved surfaces are formed on the pit bottoms of the circular dropping pits, and all of the peripheral outer edges of the dropping plate form an engagement groove for fixing the dropping plate.

3. The method of composition analysis of ultramicro-volume liquid by laser ablation plasma mass spectrometry according to claim 1, wherein in the step 1 the concentration of the hydrochloric acid solution is 6 mol/L, and the concentration of the hydrofluoric acid solution is 0.5 mol/L.

4. The method of composition analysis of ultramicro-volume liquid by laser ablation plasma mass spectrometry according to claim 1, wherein in the step 2 the rhodium standard solution is a ICPMS dedicated standard solution available from Merck, German.

5. The method of composition analysis of ultramicro-volume liquid by laser ablation plasma mass spectrometry according to claim 1, wherein in the step 3 the analysis film is a sealing film available from Parafilm, United States.

6. The method of composition analysis of ultramicro-volume liquid by laser ablation plasma mass spectrometry according to claim 1, wherein in the step 4, the laser ablation frequency is 8 Hz, the laser ablation beam spot is 74 μm, and the laser pre-ablation is preferably set as 130 pulses.

7. The method of composition analysis of ultramicro-volume liquid by laser ablation plasma mass spectrometry according to claim 1, wherein in the step 6 the correction software is Glitter or ICPMSDataCal that is currently in common use.

8. The method of composition analysis of ultramicro-volume liquid by laser ablation plasma mass spectrometry according to claim 1, wherein the ICPMSDataCal is preferably adopted as ICPMSDataCal version 10.9.

9. A method of composition analysis of ultramicro-volume liquid by laser ablation plasma mass spectrometry, the method comprising the steps of:

Step 1. cleaning and preparation of a dropping plate device: in order to avoid mixing with and contaminating by an external substance, soaking a tailor-made dropping plate successively in hydrochloric acid solution and a hydrofluoric acid solution for two hours, cleaning with deionized water, then rinsing with anhydrous ethanol for three times, and baking to dryness in an oven at 60° C. for later use;

Step 2. preparation of liquid to be tested: pipetting a certain amount of the liquid to be tested by using a pipette gun, mixing the liquid with a 1 ppm rhodium standard solution according to a ratio of 1:1, and placing the mixture in an analytical container for later use; wherein, the rhodium concentration after dilution is 0.5 ppm, which is used as an internal standard element for convenience of subsequent calculation;

Step 3. loading of ultramicro liquid: pipetting the liquid to be tested by using a 0.01 ml pipette gun in a low-temperature environment, and dropping the liquid into one dropping pit in the dropping plate, so that the liquid level is slightly higher than an overflow table in the dropping plate; dropping different liquid samples into different dropping pits by the same method; gradually covering the dropping pit with an analysis film having an area 1.5 times larger than that of the dropping plate from one side of the dropping plate after the dropping is completed, and tightly adhering the thin film onto the dropping plate by using a transparent adhesive tape after all the dropping pits are covered, and appropriately stretching and tightening the thin film, so that the thin film is in close contact with the liquid level, and excess liquid overflows from the dropping pit along the overflow table to enter an isolation groove; and placing the dropping plate covered by the thin film in a LA-ICPMS universal solid sample chamber, and fixing the dropping plate well for later testing;

Step 4. state debugging and parameter setting of a LA-ICPMS instrument: closing and vacuumizing the sample chamber, wherein helium and hydrogen are used as carrier gases, the flow rate of helium is set to 370 ml/min, the flow rate of nitrogen is set to 5 ml/min, the laser energy is 80 mJ, the laser ablation frequency is 5-10 Hz, and the laser ablation beam spot is 50-110 μm; the ablation time sequence is set as: laser pre-ablation of 120-150 pulses, and a signal collection time of 65 seconds, wherein a blank time is 25 seconds and a ablation time is 40 seconds;

Step 5. LA-ICPMS test analysis: in the test adopting an external standard-sample-external standard method, i.e., using glass standard matters NIST610 and NIST 612 as double external standards, and setting a test sequence as 2 NIST612+2 NIST610+5 sample analysis+2 NIST612+2 NIST610; and Step 6. processing and data correction of LA-ICPMS analysis signals: adopting a correction software to select a signal interval for the obtained data signals, and then adopting a "multiple external standards-single internal standard" method to carry out calculation and correction, so as to obtain final data.

10. The method of composition analysis of ultramicro-volume liquid by laser ablation plasma mass spectrometry according to claim 9, wherein in the step 1 the dropping plate device comprises a dropping plate formed from a Teflon material, multiple protruding overflow tables are formed on a top surface of the dropping plate, the top surfaces of the overflow tables are flush with each other in height, the overflow tables are spaced apart from each other at a certain distance, concave circular dropping pits with uniform or non-uniform pit diameters are formed on the overflow tables, smooth curved surfaces are formed on the pit bottoms of the circular dropping pits, and all of the peripheral outer edges of the dropping plate form an engagement groove for fixing the dropping plate.

11. The method of composition analysis of ultramicro-volume liquid by laser ablation plasma mass spectrometry according to claim 9, wherein in the step 1 the concentration of the hydrochloric acid solution is 6 mol/L, and the concentration of the hydrofluoric acid solution is 0.5 mol/L.

12. The method of composition analysis of ultramicro-volume liquid by laser ablation plasma mass spectrometry according to claim 9, wherein in the step 2 the rhodium standard solution is a ICPMS dedicated standard solution available from Merck, German.

13. The method of composition analysis of ultramicro-volume liquid by laser ablation plasma mass spectrometry according to claim 9, wherein in the step 3 the analysis film is a sealing film available from Parafilm, United States.

14. The method of composition analysis of ultramicro-volume liquid by laser ablation plasma mass spectrometry according to claim 9, wherein in the step 4, the laser ablation frequency is 8 Hz, the laser ablation beam spot is 74 μm, and the laser pre-ablation is preferably set as 130 pulses.

15. The method of composition analysis of ultramicro-volume liquid by laser ablation plasma mass spectrometry according to claim 9, wherein in the step 6 the correction software is Glitter or ICPMSDataCal that is currently in common use.

16. The method of composition analysis of ultramicro-volume liquid by laser ablation plasma mass spectrometry according to claim 9, wherein the ICPMSDataCal is preferably adopted as ICPMSDataCal version 10.9.

\* \* \* \* \*